United States Patent [19]

Swett et al.

[11] 4,008,526
[45] Feb. 22, 1977

[54] OPENABLE CURVILINEAR OPENINGS OF DIFFERENT GEOMETRICAL SHAPES

[75] Inventors: James B. Swett, Barrington; Harold P. Ashton, Providence, both of R.I.

[73] Assignee: Dart Industries Inc., Los Angeles, Calif.

[22] Filed: Oct. 2, 1972

[21] Appl. No.: 297,585

Related U.S. Application Data

[63] Continuation of Ser. No. 752,025, Aug. 12, 1968, abandoned.

[52] U.S. Cl. .................................. 35/22 A; 46/11; 46/17
[51] Int. Cl.² ......................................... G09B 19/00
[58] Field of Search ....................... 46/16, 17, 11, 1; 35/22 A, 22 R; 273/1, 156, 58 A, 58 F, 144 A

[56] References Cited

UNITED STATES PATENTS

| 2,530,082 | 11/1950 | Roth | 46/1 R X |
| 2,911,740 | 11/1959 | Miller | 35/22 A |
| 2,975,547 | 3/1961 | Greve | 46/11 |
| 3,008,719 | 11/1961 | Misko | 273/144 A |
| 3,251,154 | 5/1966 | Taylor | 46/11 |

FOREIGN PATENTS OR APPLICATIONS

| 660,489 | 11/1951 | United Kingdom | 273/156 |
| 1,109,819 | 4/1968 | United Kingdom | 35/22 A |

*Primary Examiner*—F. Barry Shay
*Attorney, Agent, or Firm*—Leigh B. Taylor; Kenneth J. Hovet; Paul R. Wylie

[57] ABSTRACT

A toy comprising a hollow body member having a plurality of differently configurated openings and a plurality of block members corresponding in cross-sectional configuration to the openings. In a preferred embodiment the hollow body member is formed as two halves joined together by a spring means which permits the member to be "broken apart" to release the individual pieces. The holes in the hollow body member are located on plane defining portions which are in turn located adjacent curvilinear surface portions of said hollow body member. The block members can be used individually as molds or foodstuff cutters, stacking blocks, etc.

3 Claims, 28 Drawing Figures

INVENTOR.
JAMES B. SWETT
HAROLD P. ASHTON
BY
Paul R. Wylie
ATTORNEY

FIG. 6
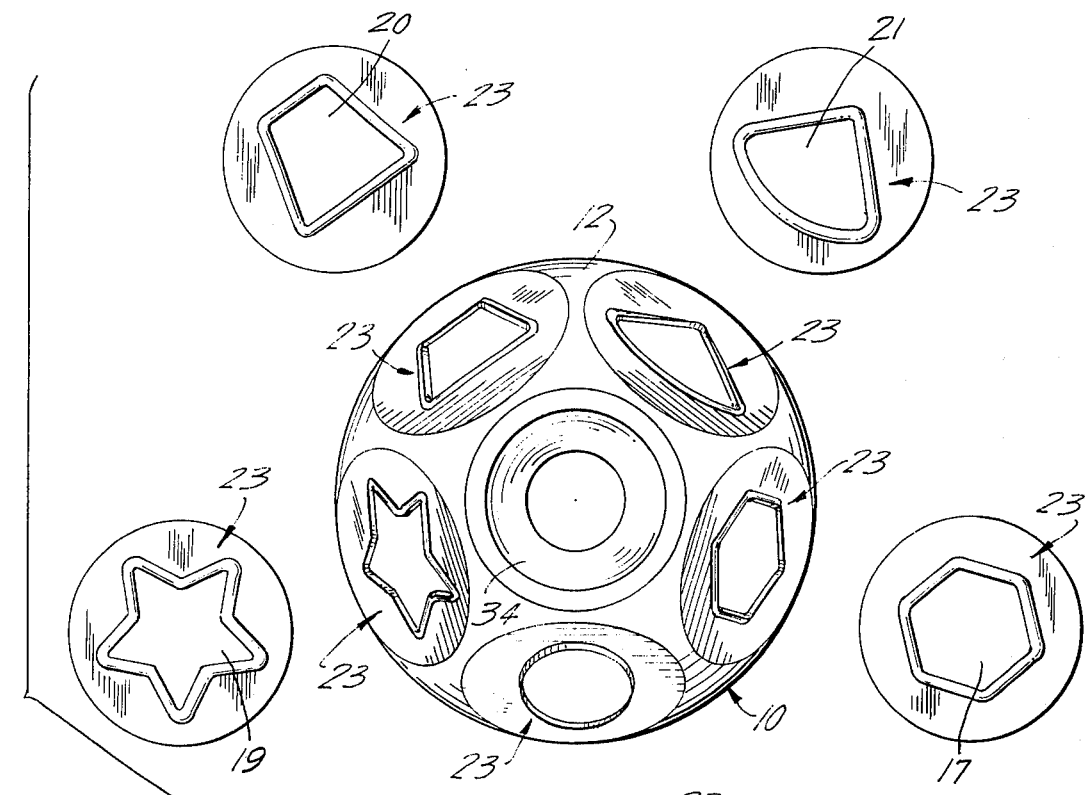
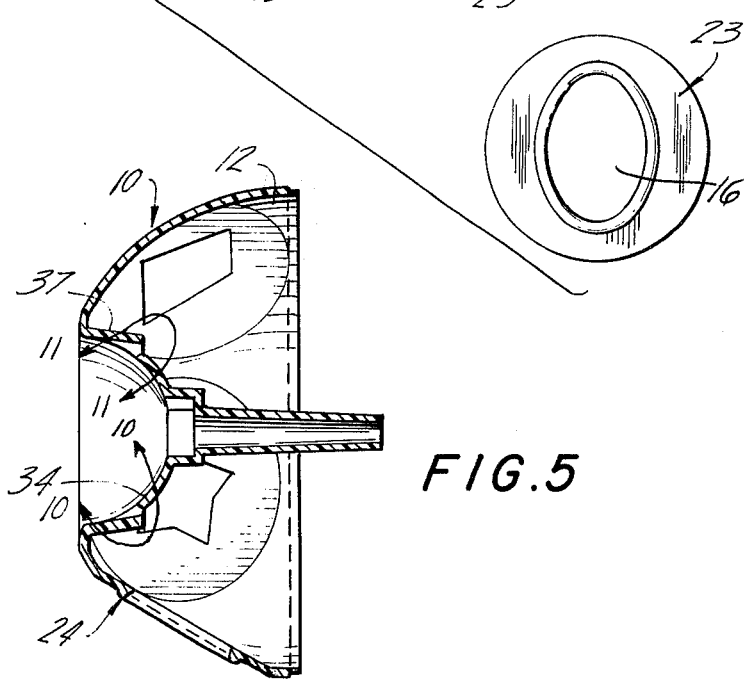
FIG. 5
INVENTORS.
JAMES B. SWETT
HAROLD P. ASHTON
BY Paul R. Wylie
ATTORNEY

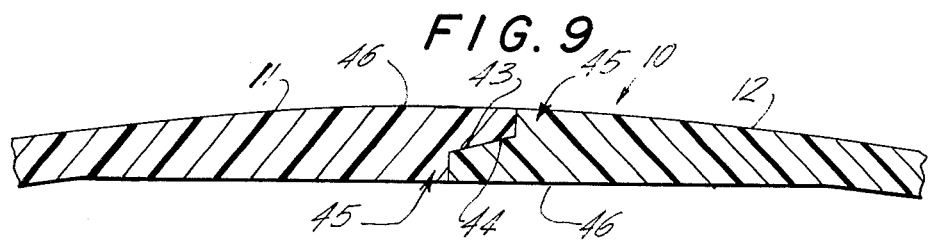
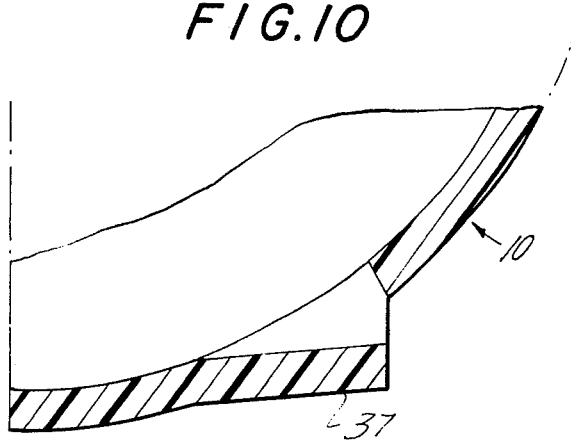
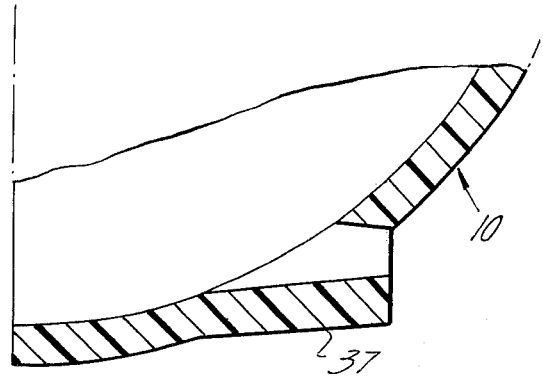
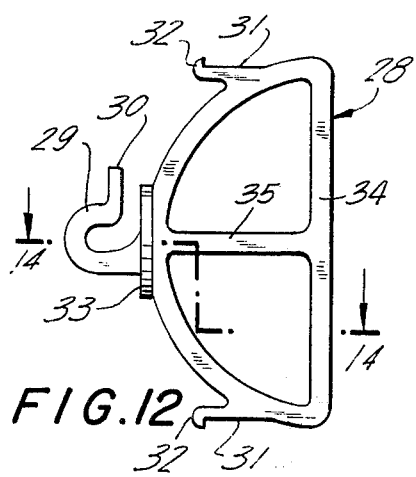
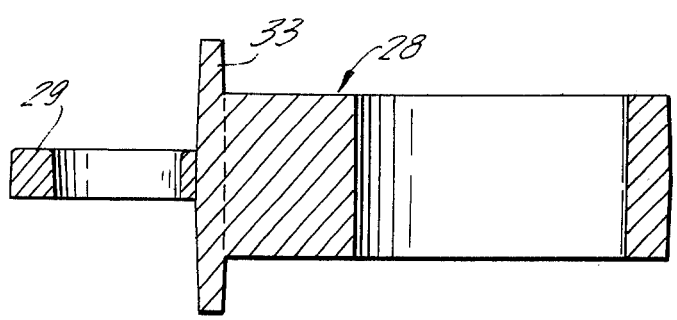
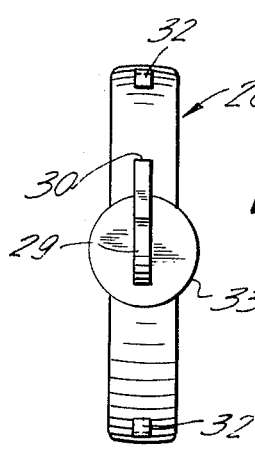

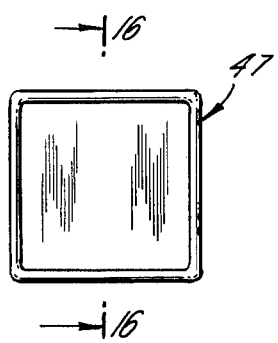
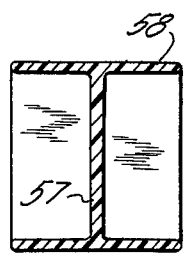
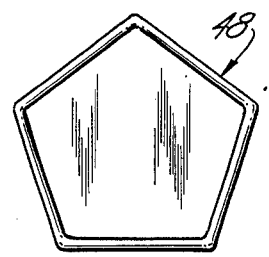
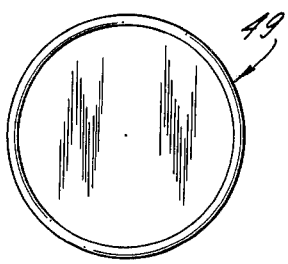
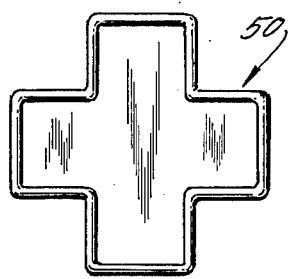
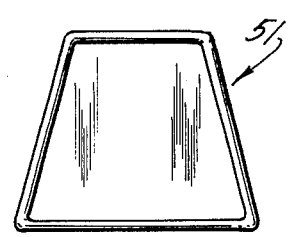
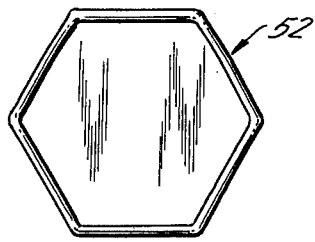
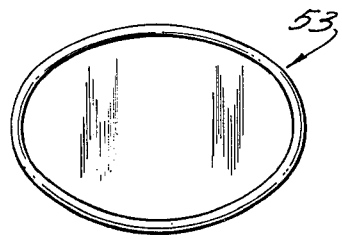
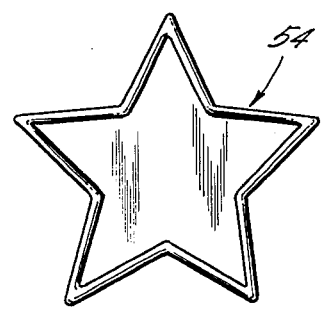
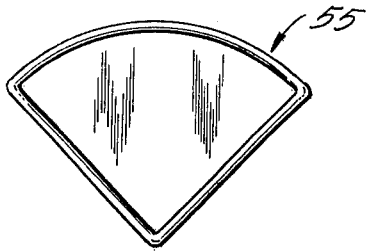
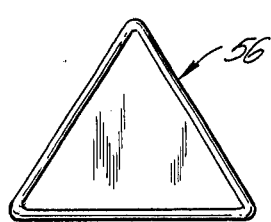

INVENTORS.
JAMES B. SWETT
HAROLD P. ASHTON
BY
Paul R. Wylie
ATTORNEY

OPENABLE CURVILINEAR OPENINGS OF DIFFERENT GEOMETRICAL SHAPES

This is a continuation of application Ser. No. 752,025, filed Aug. 12, 1968 now abandoned.

This invention relates generally to toys. More particularly, it relates to a multi-component toy including a hollow body member with a plurality of openings and a number of block pieces adapted to be inserted in the openings. The openings are of different configurations to accept pieces of corresponding configurations. The block pieces are formed such that they will not readily be discharged through the openings once they are introduced into the hollow body member.

According to the invention there is provided a toy comprising a hollow body member that is adapted to receive individual block toy components through openings therein. The openings are formed adjacent plane defining portions of the hollow body member. The plane defining portions are formed adjacent curvilinear surface portions of the hollow body member so that the member be maintained in stable resting position on a tubular surface only on the plane portions. With this feature, the hollow body member can be rolled while at the same time sufficient surface area is available to maintain the member in a stable position when the member is stopped. The latter condition is necessary when a young child desires to introduce the block members into the holes of the hollow body member.

Another principal aspect of the invention is the provision of a toy comprising a hollow body member of the foregoing type and having at least two parts adapted to be separated. A spring means is attached to the parts and structural provisions are provided to urge the parts together. The spring means permits the parts to be separated a distance sufficient to remove the block members from the interior of the hollow body member.

It was an object of this invention to provide a toy of the type described which could be maintained in stable resting position.

Another object of the invention was the provision of a toy of the type described wherein the hollow body member could be "broken apart" to release the pieces contained therein.

Still another object of the invention was the provision of handle members for pulling the two parts of the hollow body member apart.

Another object of the invention was the provision of structure whereby the two parts of the hollow body member could be maintained in alignment when they were pulled apart.

Still another object of the invention was the provision of planer portions containing holes on a generally curvilinear structure.

Yet another object of the invention was the provision of a toy which could be used in a variety of games, etc. to interest children in a wide age group.

Another object of the invention was the provision of a toy that could be adjusted to provide a more suitable implement for children of varying ages.

These and other objects of the invention will be more fully understood with reference to the accompanying drawings which show specific embodiments of the invention and wherein:

FIG. 5 is a cross-sectional view of the right hand hemispherical part of FIG. 3, shown as it would appear before assembly into the hollow body member;

FIG. 6 is a bottom plan view of the hollow body member shown in FIG. 1;

FIG. 9 is a fragmentary cross-section taken within line 9—9 of FIG. 4;

FIG. 10 is a fragmentary cross-section taken within line 10—10 of FIG. 5;

FIG. 11 is a fragmentary cross-section taken within line 11—11 of FIG. 5;

FIG. 12 is a side view of the handle member which forms part of the hollow body member as shown in the preceding figures;

FIG. 13 is a left side view of the handle member shown in FIG. 12;

FIG. 14 is an enlarged cross-sectional view taken on line 14—14 of FIG. 12;

FIG. 15 is a plan view of one of the individual block pieces forming part of the inventive toy;

FIG. 16 is a cross-section view taken on line 16—16 of FIG. 15 and illustrating a typical cross-section of the individual block pieces of the invention;

FIGS. 17 through 25 are plan views of differently configurated individual block pieces according to the invention;

Figure 1:
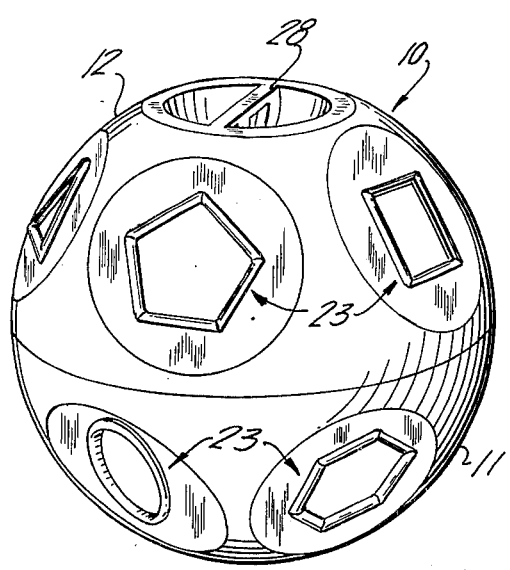
FIG. 1 is a view in perspective showing the hollow body member of the invention.
Figure 2:
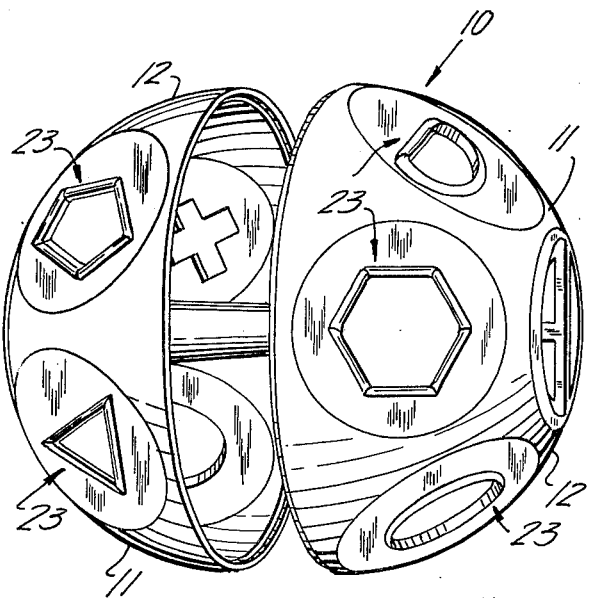
FIG. 2 is a view in perspective showing the hollow body member of the invention as it would appear with two hemispherical halves being separated for removal of internal block members.

Referring now to the drawing hollow body member 10, which is basically of spherical configuration, is formed of two hemispherical halves 11 and 12. Located around the periphery of hollow body member 10 are holes of various configurations. The holes are formed as a pentagon 13, equilateral triangle 14, square 15, oval 16, hexagon 17, cross 18, five-pointed star 19, trapezoid 20, wedge 21 and square 22. The holes are located on plane defining portions 23 which are separated from each other by curvilinear portions of the generally spherical hollow body member. The plane defining portions including a bead edge portion 24 around each hole including a rounded top 25 and slanted lead in surface 26 to facilitate introduction of individual block pieces into the hollow body member.

For the purpose of maintaining the two hemispherical halves 11 and 12 of the hollow body member together a spring means in the form of a shock cord 27 is provided. The shock cord acts to maintain tension upon the two halves when they are separated and to continuously urge the halves together. The shock cord is connected at either end to a handle 28. As shown in FIG. 12, the handles are provided with hooks 29 which are adapted to hold the shock cord at either end. The hooks have extension 30, the function of which will be hereinafter described. The handles are further provided with extensions 31 and catch hooks 32 extending therefrom. A collar 33 is formed adjacent the hook 29. The handle further includes a top bar 34 that is finger engageable and a divider 35. It is desirable to have the handle of such a size that the finger digits of a user, whether adult or child, can easily engage the handle 28 for adjustments of a type which will be hereinafter described.

Figure 3:
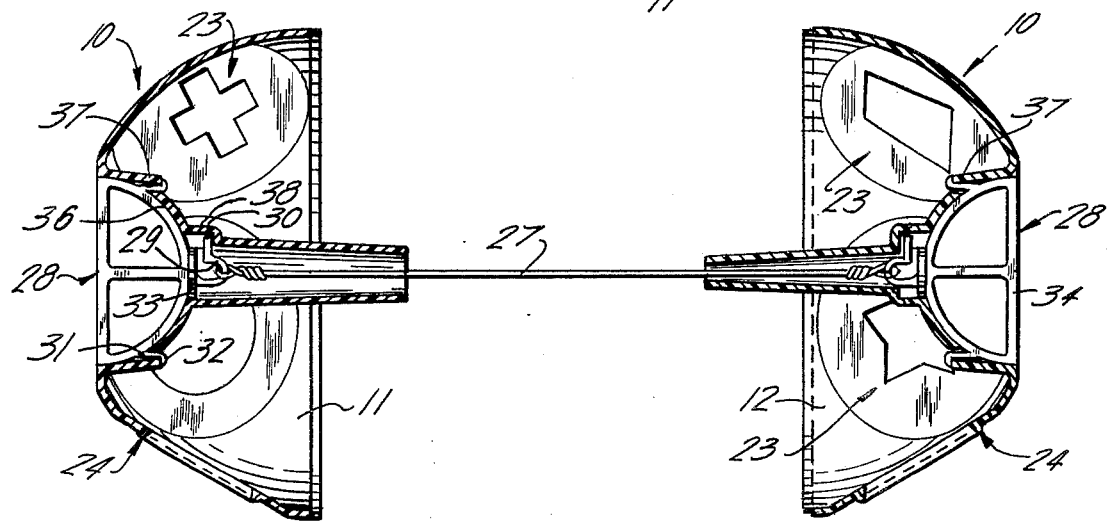
FIG. 3 is a cross-sectional view of the hollow body member of the invention showing the two hemispherical halves separated.
Figure 4:
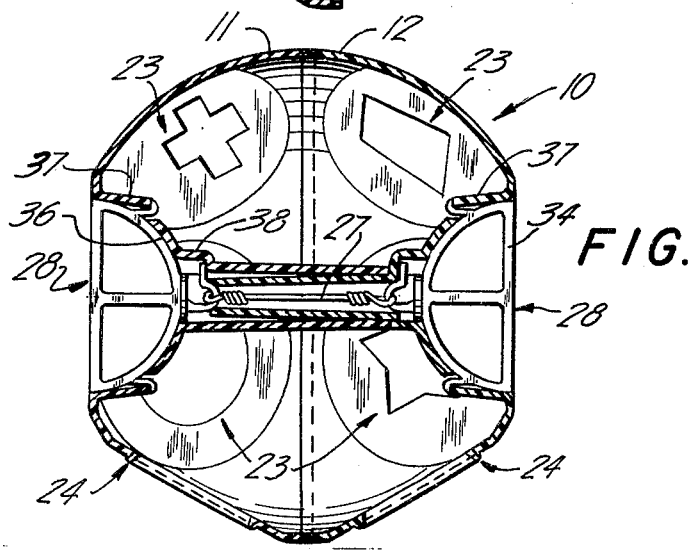
FIG. 4 is a view similar to FIG. 3 and showing the two hemispherical halves in an engaged position to form the hollow body member.
Figure 8:
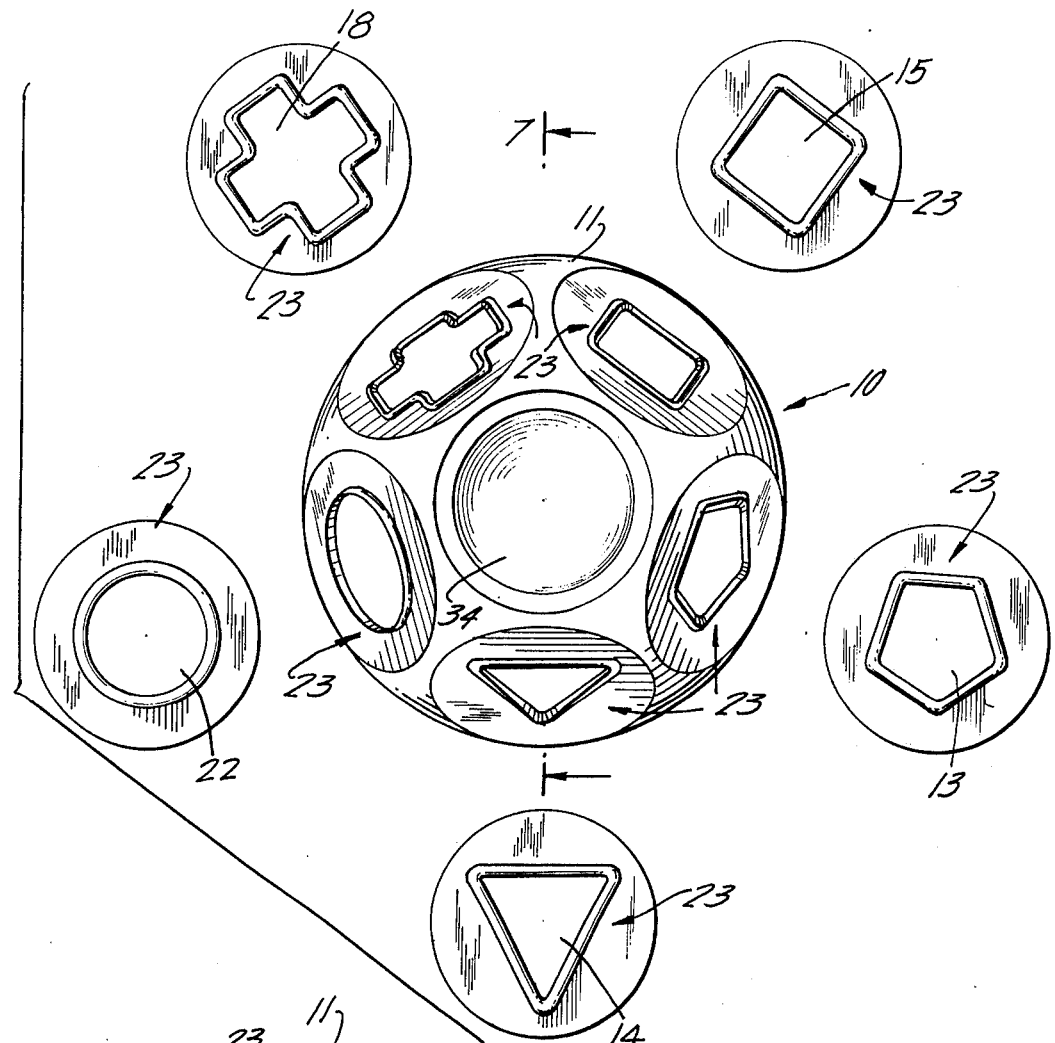
FIG. 8 is a top plan view of the hollow body member.
Figure 7:
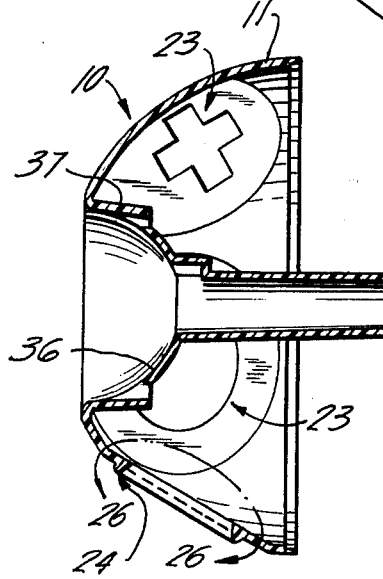
FIG. 7 is a cross-sectional view of the left hand hemispherical part of FIG. 3, shown as it would appear before assembly into the hollow body member.
Figure 27:
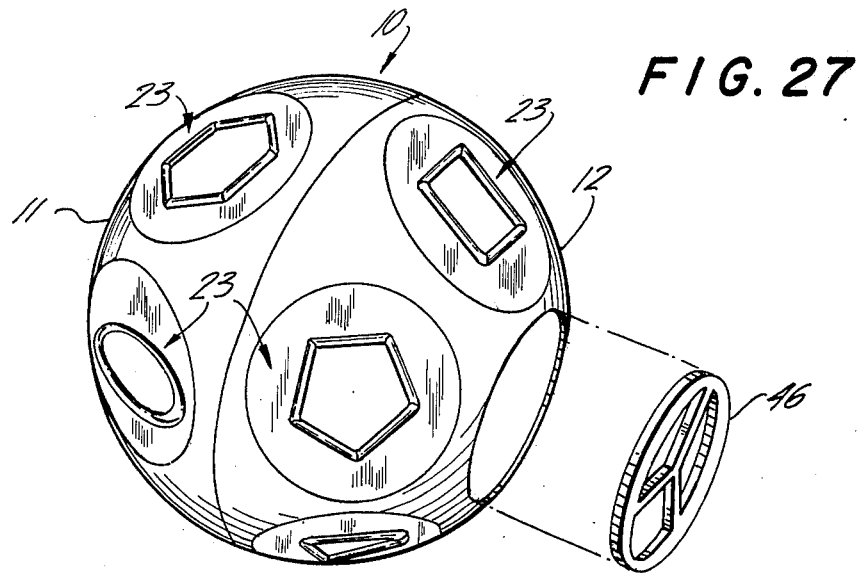
FIG. 27 is a perspective view of a hollow body member shown with a cover portion thereof in an exploded relation and representing an alternative embodiment of the invention; and, FIG. 28 is a view in perspective of a hollow body member according to one of the embodiments of the invention with a portion thereof broken away to show interior details.
Figure 28:
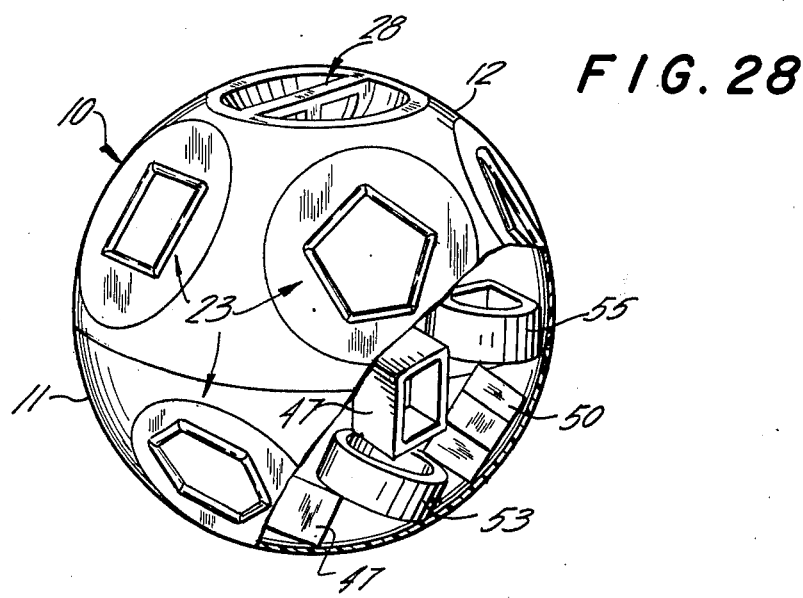

Each of the hemispherical halves 11 and 12 of hollow body member 10 are provided with recesses 36 for receiving handles 28. The recesses are further provided with cutouts 37 and an indent 38. As best seen in FIG. 3, the structure previously described can be adjusted to provide varying degrees of tension on the shock cord. Normally, when handle 28 is fully engaged in recess 36, catch hooks 32 of handle projects 31 engage the undersurfaces of cutouts 37. Moreover, extension 30 is positioned within indent 38. However, with both handles firmly grasped the handle members can be removed from recesses 36 and rotated to tighten the shock cord between them. Even if the handle members are engaged in recesses 36, the necessary tensioning of the shock cord can be accomplished by simply twisting the two halves of the hollow body member in opposite directions. Similarly, the tension on the shock cord can be reduced by twisting the halves in the reverse direction.

The tension on shock cord 27 can be increased in the foregoing manner to an extent where the two halves 11 and 12 can be forced together and will not be separated. This condition may be desirable when the toy is used by very small children. On the other hand, the tension on the shock cord 27 can be reduced to an extent such that the telescoping portions as shown exaggeratedly in FIG. 3 of the two halves 11 and 12 will become disengaged and the hollow body member can then be opened in the manner of a clam shell. This feature may be desirable in performing the various game steps to which the toy is adapted.

Tubular extensions 39 and 40 are adapted to interfit in telescoping relationship when the hollow body member is in an "unseparated" condition. Moreover, the tubular extensions 39 and 40 are of sufficient length to be maintained in loosely interfitted and aligned relationship even though the two spherical halves are separated to remove the individual block pieces. Simply releasing one of the halves will result in the hollow body member being reformed in perfect alignment with the mating surfaces of edge portion 45 in mating relationship. To further insure the mating of the edge portion 45 angled lead in surfaces 43 and 44 are provided on the corresponding edges. Thickened portion 46 of the edge portion 45 further provides stability to the hemispherical halves 11 and 12 whereby deformation cannot be readily accomplished.

Figure 26:
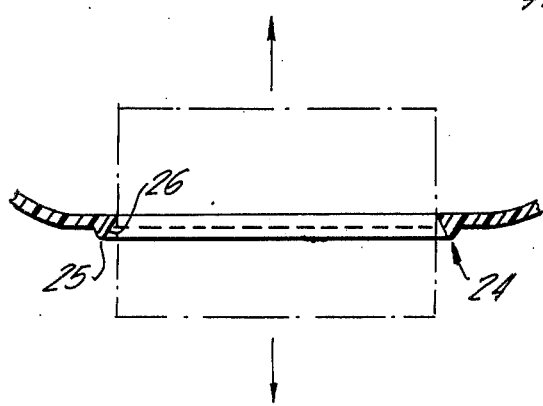
FIG. 26 is a fragmentary cross-sectional view taken within line 26—26 of FIG. 7 showing details of the holes in the hollow body member and showing the relationship of the hole with one of the individual block pieces which is shown in phantom lines.

The individual block pieces of the toy are shown in FIGS. 15 through 25. These include pieces formed as a square 47, pentagon 48, circle 49, cross 50, trapezoid 51, hexagon 52, oval 53, star 54, wedge 55, and triangle 56. The cross section of the square piece 47 as shown in FIG. 16 is typical of all of the individual block pieces. As seen in the latter figure, a central wall 57 is provided intermediate wall portion 58. The wall portion is of such a length that binding in the openings of the hollow body member is eliminated. As best seen in FIG. 26, the relationship between the walls 58 of the block pieces and the holes of the hollow body member are such that a relatively tight fit is provided. This fit is necessary in order to eliminate the possibility of introducing a block piece into a hole of a different configuration.

The toy according to the invention and the individual components are adapted to a variety of uses as playthings. The hollow body member with the blocks serves as an interesting rattle for infants. Due to the irregular path upon which the hollow body member will roll it makes an interesting game ball for toddlers. The individual block pieces are well adapted for use as sand molds, cookie cutters and for stacking. Older children may also use the toy for various games. For example, two children might each take five blocks and roll the hollow body member back and forth between them. If the opening facing up when the toy stops in front of a child matches one of his blocks, he can insert it. If not, the child losses his turn and rolls it back to his opponent. The first child to get all the blocks in the hollow body member wins the game.

The foregoing describes a specific embodiment of the invention, the scope of which is defined by the following claims.

We claim:

1. A toy adapted for the introduction into and storage therein of individual block members and comprising an enclosed hollow body member having curvilinear surface portions and a plurality of plane defining portions adjacent one another, said plane defining portions being adapted to maintain said toy in stable resting positions on any suitable supporting surface and further having openings of different geometrical shapes formed therein communicating with the interior of said hollow body member, each of which is adapted only to accommodate the passage therethrough of a said block member which is of the geometrical shape corresponding thereto, and additional means to gain access to the interior of said hollow body for removing said block members therefrom.

2. A toy adapted for the introduction into and storage therein of individual block members and comprising a hollow body member having at least two separable parts each including guide means operatively associated in a manner for maintenance thereof in alignment during separation, said hollow body member further including adjacently positioned plane defining portions having openings therein for introduction therethrough of said block members, spring means attached to said parts in a manner to urge them together yet enable a sufficient separation therebetween so that the block members may be removed therefrom and handle means attached to each of said parts in an appropriate manner to be grasped in applying the force necessary to counteract said spring means in separating said parts.

3. A toy according to claim 2 wherein said guide means is formed by interfitting tubular extensions through which said spring means extends between said handle means.

* * * * *